(12) United States Patent
Striegel et al.

(10) Patent No.: US 7,374,236 B2
(45) Date of Patent: May 20, 2008

(54) VEHICLE ROOF HAVING OPENABLE ROOF PARTS

(75) Inventors: Klaus Striegel, Hamburg (DE);
Berthold Klein, Rutesheim (DE);
Wolfram Salz, Sachsenheim (DE);
Waleri Katrini, Dresden (DE)

(73) Assignee: Magna Car Top Systems GmbH,
Bietiesheim-Bissingen (DE)

( * ) Notice: Subject to any disclaimer, the term of this patent is extended or adjusted under 35 U.S.C. 154(b) by 0 days.

(21) Appl. No.: 11/537,061

(22) Filed: Sep. 29, 2006

(65) Prior Publication Data
US 2007/0075571 A1    Apr. 5, 2007

(30) Foreign Application Priority Data
Oct. 4, 2005   (DE) ...................... 10 2005 047 505

(51) Int. Cl.
*B60J 7/047* (2006.01)
(52) U.S. Cl. ............................................... 296/220.01
(58) Field of Classification Search .......... 296/220.01, 296/216.02
See application file for complete search history.

(56) References Cited

U.S. PATENT DOCUMENTS

| | | | | |
|---|---|---|---|---|
| 4,911,496 A | * | 3/1990 | Fuerst | ................... 296/220.01 |
| 5,197,779 A | * | 3/1993 | Mizuno et al. | ........ 296/220.01 |
| 6,416,122 B1 | | 7/2002 | Schwarz | |
| 6,443,520 B1 | * | 9/2002 | Schmaelzle et al. | ... 296/216.08 |
| 6,457,770 B1 | * | 10/2002 | Pfalzgraf et al. | ........... 296/217 |
| 6,805,402 B2 | * | 10/2004 | Pfalzgraf | ............... 296/220.01 |

FOREIGN PATENT DOCUMENTS

EP        0 810 930 B1    12/1997

* cited by examiner

*Primary Examiner*—Dennis H Pedder
(74) *Attorney, Agent, or Firm*—Brooks Kushman P.C.

(57) ABSTRACT

A vehicle roof includes a roof opening in a roof skin. First and second roof parts are movable between a closed position in which the parts are arranged flush behind one another within the roof opening to thereby close off the roof opening and in an opened position in which the second part is lowered with respect to the roof skin and the first part extends over the second part to thereby expose the roof opening. A kinematic support mechanism is movable to an extended position in which the mechanism fixes the second part in the closed position and in a retracted position in which the mechanism lowers the second part in the opened position. The first part and the mechanism are connected to one another such that the first part actuates the mechanism between its positions in response to the first part moving between the closed and opened positions.

18 Claims, 4 Drawing Sheets

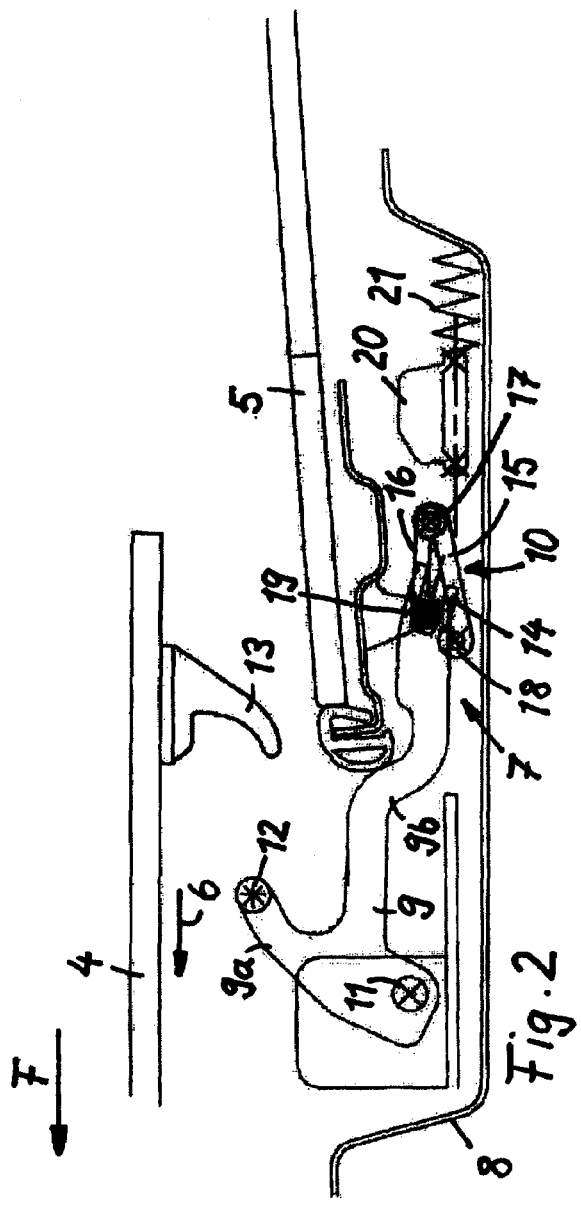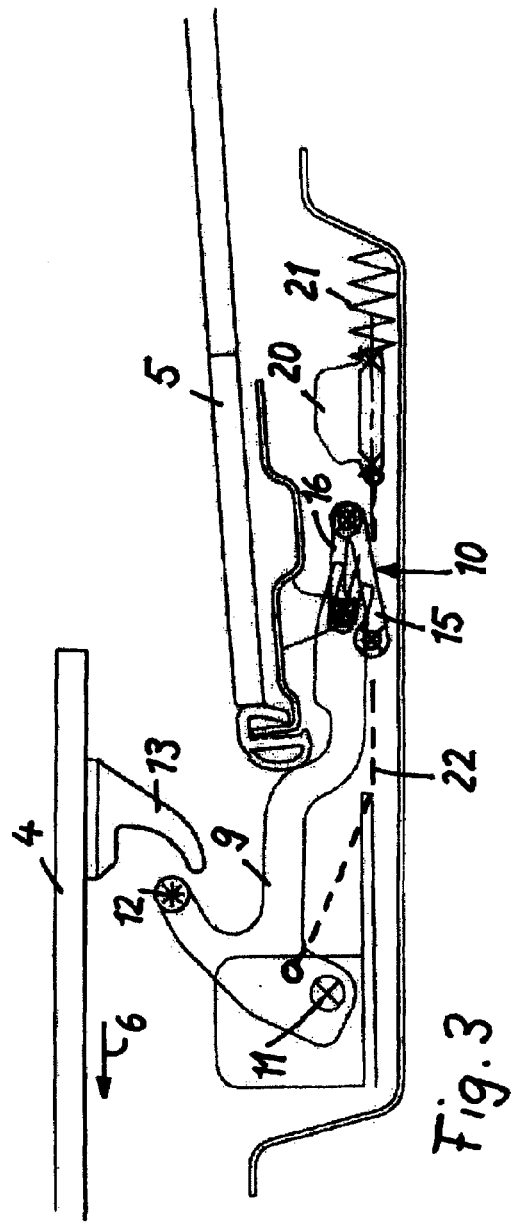

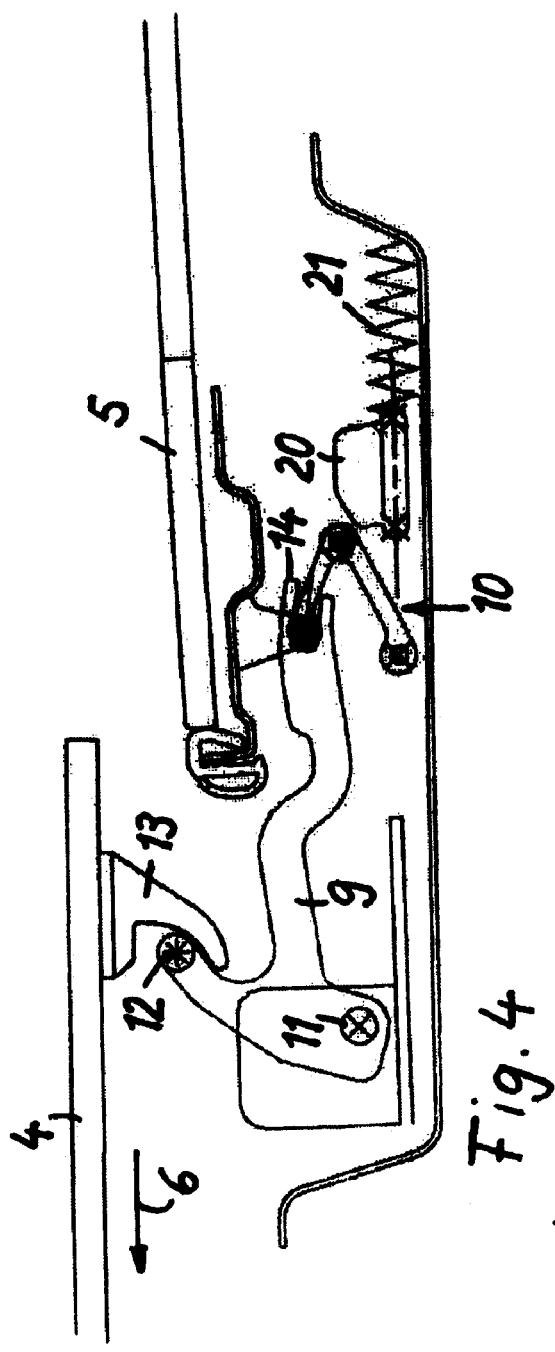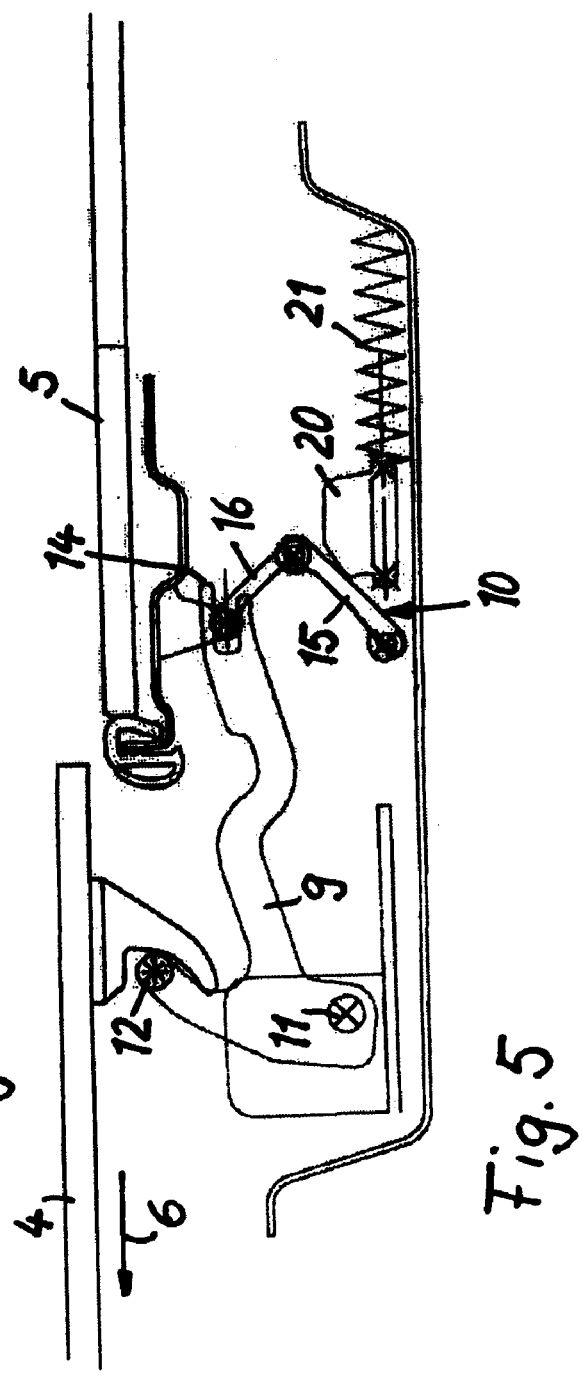

VEHICLE ROOF HAVING OPENABLE ROOF PARTS

CROSS-REFERENCE TO RELATED APPLICATIONS

This application claims foreign priority benefits under 35 U.S.C. § 119(a)-(d) to DE 10 2005 047 505.1, filed Oct. 4, 2005, which is hereby incorporated by reference in its entirety.

BACKGROUND OF THE INVENTION

1. Field of the Invention

The present invention relates to a vehicle roof having a roof opening within a fixed roof skin in which at least two roof parts are flush behind one another in a closed position which closes off the roof opening and in which the roof parts partially overlap one another in an opened position which exposes the roof opening.

2. Background Art

DE 199 53 104 C1 (corresponds to U.S. Pat. No. 6,416, 122) describes a vehicle roof having two roof covers (i.e., roof parts) situated in a common roof opening of a vehicle. The roof parts are adjustable between closed and opened positions. In the closed position, the roof parts are flush one behind the other to cover the roof opening. In the opened position, one of the roof parts is lowered from the roof opening with respect to the closed position and comes to rest beneath the other roof part. A kinematic adjustment mechanism actuates the roof parts between the closed and opened positions. The kinematic adjustment system includes a guide member running on either side of the roof opening. Each guide member has a sliding track inserted therein. Laterally projecting guide pins on the roof parts are guided in the sliding tracks. Each guide member has an upper horizontal section and a section displaced downward therefrom. In the closed position, the upper horizontal section is associated with one of the roof parts. In the opened position, the downwardly displaced section is associated with one of the roof parts. To open the roof into the opened position, the kinematic adjustment mechanism lowers a first one of the roof parts and moves the first roof part underneath the other roof part. The guide members are located in a longitudinally displaceable slide. A drive mechanism moves the slide relative to the roof parts, thereby achieving the lifting or lowering motion of the first roof part.

The horizontal sections of the guide members provide an effective vertical support of the first roof part when the roof is in the closed position. However, a complex kinematic mechanism is necessary for this purpose. In particular, the adjusting motion of the slide having the guide members must be coordinated with the displacement motion of the roof parts

SUMMARY OF THE INVENTION

An object of the present invention is to provide by a vehicle roof having front and rear openable roof parts in a roof opening in which the roof parts are stably mounted when the roof is in the closed position and undesired lowering motion of the rear roof part is prevented.

In carrying out the above object and other objects, the present invention provides a vehicle roof having a roof opening in a fixed outer roof skin. The roof includes first and second roof parts (i.e., covers). The roof parts are movable between a closed roof position in which the roof parts are arranged flush behind one another within the roof opening to thereby close off the roof opening and in an opened roof position in which the second roof part is lowered with respect to the fixed outer roof skin and the first roof part extends over the second roof part to thereby expose the roof opening. A kinematic support mechanism is movable to an extended support position in which the kinematic support mechanism fixes the second roof part in the closed roof position and in a retracted support position in which the kinematic support mechanism lowers the second roof part in the opened roof position. The first roof part and the kinematic support mechanism are connected to one another such that the first roof part actuates the kinematic support mechanism between the support positions in response to the first roof part moving between the closed and opened roof positions.

In carrying out the above object and other objects, the present invention provides a vehicle roof having a roof opening in a roof skin. Front and rear roof parts are movable between a closed roof position in which the roof parts are arranged flush behind one another within the roof opening to thereby close off the roof opening and in an opened roof position in which the rear roof part is lowered with respect to the roof skin and the front roof part extends over the rear roof part to thereby expose the roof opening. A kinematic knee lever mechanism has lower and upper knee levers articulately connected to one another. The knee levers are movable to an extended support position to fix the rear roof part in the closed roof position and in a retracted support position to lower the rear roof part in the opened roof position. The lower knee lever is articulately connected to a fixed support and the upper knee lever is articulately connected to the rear roof part. The front roof part and the kinematic knee lever mechanism are connected to one another such that the front roof part actuates the knee levers of the kinematic knee lever mechanism between the support positions in response to the front roof part moving between the closed and opened roof positions.

In accordance with an embodiment of the present invention, a vehicle roof has front and rear openable roof parts situated within a common roof opening in a fixed outer roof skin. In a closed position of the roof, the roof parts are arranged flush behind one another to thereby close off the roof opening. In the closed position, the rear edge of the front roof part borders the front edge of the rear roof part, while the front edge of the front roof part, the rear edge of the rear roof part, and the side edges of the roof parts lie flush with the fixed outer roof skin. To move from the closed position to an opened position of the roof, the front edge of the rear roof part is moved downward with respect to the plane of the fixed outer roof skin and the front roof part is moved over the rear roof part to thereby expose the roof opening. Likewise, to move from the opened position back to the closed position, the front roof part is moved away from the rear roof part and the front edge of the rear roof part is moved upward until lying flush with the fixed outer roof skin.

A kinematic support mechanism fixes the rear roof part in place with the roof is in the closed position. The kinematic support mechanism supports the rear roof part in the closed position, thereby reliably preventing an undesired or unintentional lowering motion of the rear roof part when the roof is closed. As such, the kinematic support mechanism acts upon the rear roof part.

The front roof part acts upon the kinematic support mechanism in a direction of a support position of the kinematic support mechanism thereby preventing the kinematic support mechanism from inadvertently giving way and thus prevent the rear roof part from lowering even when relatively large forces act on the rear roof part.

In the closed position, the kinematic support mechanism fixes the height of the rear roof part and is locked in place by the front roof part. In this manner, the height of the rear roof part can be fixed by the adjusting motion of the front roof part. The front roof part advantageously achieves the transfer of the kinematic support mechanism to the support position as well as maintenance of the kinematic support mechanism in the support position. In this manner, a relatively simple design for the kinematic support mechanism is sufficient for providing effective support when the roof is in the closed position. No complicated coupling kinematic system is required for a motion coupling between the roof parts such that conventional kinematic mechanisms may achieve the adjusting motion of the roof parts.

In an embodiment of the present invention, the front roof part which triggers the support function is longitudinally displaceable along the plane of the fixed outer roof skin and is not upwardly or downwardly displaceable like the rear roof part. The front roof part is guided in lateral guides bordering the longitudinal extending sides of the roof opening at the level of the fixed outer roof skin. To open the roof, the rear roof part is lowered thereby enabling the front roof part to be slid horizontally above the rear roof part. Optionally, the rear roof part may undergo an additional displacement motion thus allowing an overall larger roof opening to be exposed.

In an embodiment of the present invention, the kinematic support mechanism includes a kinematic knee lever mechanism. The kinematic knee lever mechanism is movable by the front roof part into an extended position. A knee lever of the kinematic knee lever mechanism supports the rear roof part when the kinematic knee lever mechanism is in the extended position. The kinematic knee lever mechanism advantageously includes two knee levers articulately connected to one another. The front roof part moves the knee levers into the extended position of the kinematic knee lever mechanism. To this end, the front roof part acts on a transmission arm to move the knee levers into the extended position. It may be practical to achieve a substantially extending position, but not the complete extended position, to ensure the kinematic knee lever mechanism can easily leave the extended position when the roof is opened, which in the case of a dead center position or beyond dead center position would not be possible without additional application of force.

However, dead center or beyond dead center positions may also be considered in which the rear roof part is supported by the kinematic knee lever mechanism. To allow the dead center or beyond dead center position to be abandoned when the roof is opened, one or both of the knee levers of the kinematic knee lever mechanism may be acted upon in the direction of the folded-up position by an additional rod. Advantageously, the front roof part likewise actuates the additional rod.

To achieve a secure locking of the kinematic support mechanism despite an approximately extended position, the kinematic support mechanism is advantageously secured by a component which is to be actuated by the front roof part. This component, such as a locking slide coupled by a Bowden cable to the front roof part, is also controlled by the motion of the front roof part so that additional drive devices may be omitted. When the closed position is reached, the front roof part thus actuates and displaces the kinematic support mechanism into the support position, as well as the locking slide which locks the kinematic support mechanism. When the roof is opened the motion sequence occurs in the opposite direction such that the locking slide is removed from the kinematic support mechanism. This may optionally occur with the use of a spring element acting on the locking slide. The support from the rear roof part is then removed as the kinematic support mechanism is deflected from its support position by the opening of the front roof part. After the support is removed, the drive device can move the rear roof part into the lowered position.

The above features, and other features and advantages of the present invention are readily apparent from the following detailed descriptions thereof when taken in connection with the accompanying drawings.

BRIEF DESCRIPTION OF THE DRAWINGS

FIG. 2 illustrates a side view of the roof parts at an intermediate position during a closing motion from the opened position to the closed position, together with a kinematic support mechanism which is actuated by the front roof part and acts on the rear roof part;

FIG. 3 illustrates a side view of the roof parts at a position between the intermediate position and the closed position, together with the kinematic support mechanism;

FIG. 4 illustrates the roof parts at a position just before the closed position, together with the actuation of the kinematic support mechanism which results in lifting and locking of the rear roof part;

FIG. 5 illustrates the roof parts and the kinematic support mechanism in a position closer to the closed position than shown in FIG. 4.

DETAILED DESCRIPTION OF THE PREFERRED EMBODIMENT(S)

Figure 1:
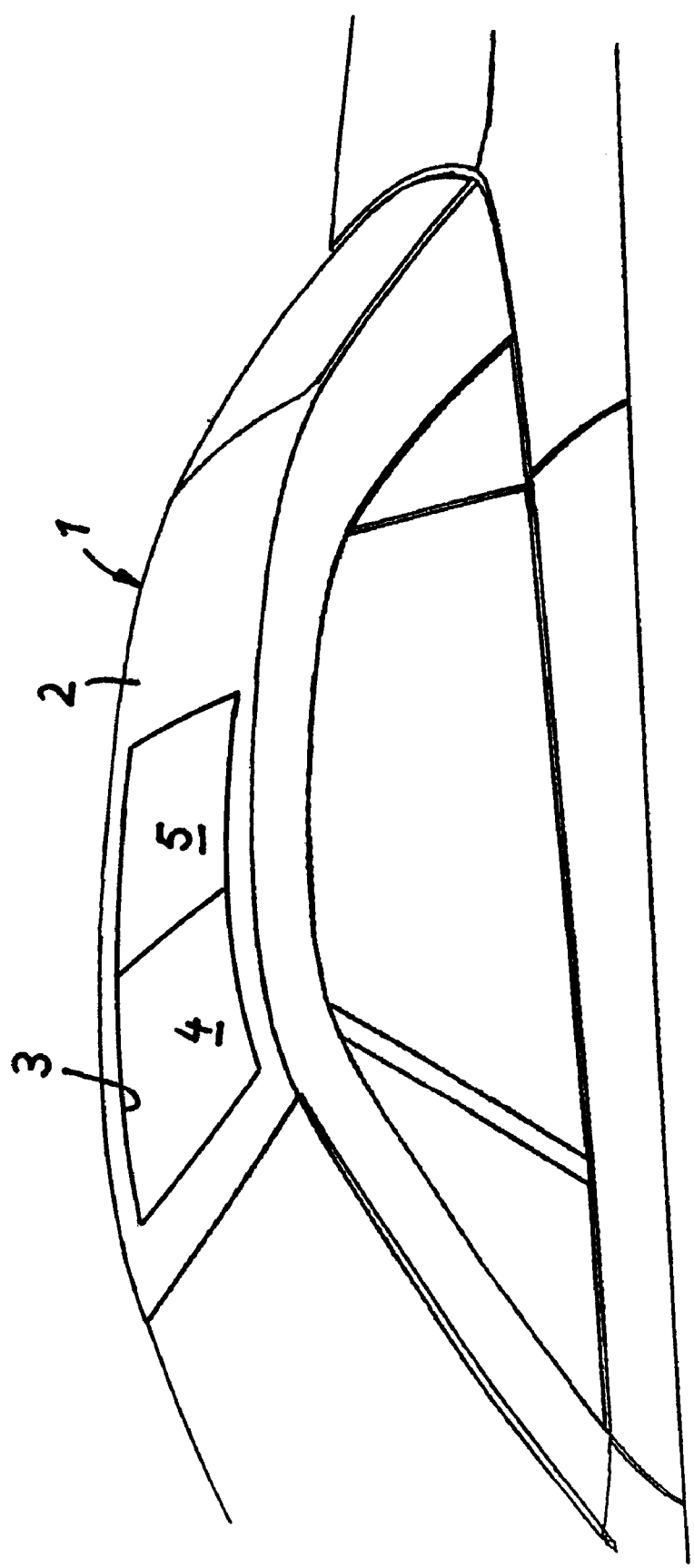
FIG. 1 illustrates a perspective view of a vehicle roof having front and rear adjustable roof parts situated in a roof opening of a fixed roof skin in accordance with an embodiment of the present invention is shown.

Referring now to FIG. 1, a perspective view of a vehicle roof 1 having front and rear openable roof parts 4, 5 situated within a common roof opening 3 of a fixed outer roof skin 2 in accordance with an embodiment of the present invention is shown. Roof 1 has a solid design and is fixedly connected to a motor vehicle body. In a closed position of roof 1 (shown in FIG. 1), roof parts 4, 5 are arranged flush behind one another within roof opening 3 to thereby close off roof opening 3. Roof parts 4, 5 lie one behind one another as viewed in the longitudinal direction of the vehicle in the closed position. Particularly, in the closed position, the rear edge of front roof part 4 borders the front edge of rear roof part 5, while the front edge of front roof part 4, the rear edge of rear roof part 5, and the side edges of roof parts 4, 5 lie flush with fixed outer roof skin 2.

In an opened position of roof 1, the front edge of rear roof part 5 is lowered with respect to fixed outer roof skin 2 and the front roof part 4 extends over the rear roof part 5 to thereby expose roof opening 3. To move from the closed position to the opened position, the front edge of rear roof part 5 is moved downward with respect to the plane of fixed outer roof skin 2 and front roof part 4 is horizontally moved along the rearward direction of the vehicle over (i.e., longitudinally displaced along the plane of fixed outer roof skin 2) rear roof part 5 to thereby expose roof opening 2.

Likewise, to move from the opened position to the closed position, front roof part 4 is horizontally moved along the forward direction of the vehicle to move away from rear roof part 5 and the front edge of rear roof part 5 is moved upward to lie flush with fixed roof outer skin 2.

Referring now to FIGS. 2, 3, 4, 5, and 6, with continual reference to FIG. 1, side views of roof parts 4, 5 during a closing motion from the opened position to the closed position are shown. These views illustrate in detail roof 1 in the region of the roof cutout, together with front and rear roof parts 4, 5. Arrow F denotes the forward direction of the vehicle.

During a closing motion towards the closed position of roof 1, front roof part 4 moves forward along a horizontal plane in the direction indicated by arrow 6. That is, front roof part 4 moves forward in a direction parallel to the forward F direction of the vehicle. Front roof part 4 undergoes a translational displacement motion at a level approximate to the level of fixed outer roof skin 2. During the closing motion, the front edge of rear roof part 5 moves upward from a lowered position. Rear roof part 5 lies flush with fixed outer roof skin 2 once the closed position of roof 1 has been reached.

During an opening motion towards the opened position of roof 1, front roof part 4 moves rearward along the horizontal plane in a direction opposite to the direction indicated by arrow 6. That is, front roof part 4 is moved backwards in a direction parallel to the forward F direction of the vehicle. Front roof part 4 comes to rest above rear roof part 5 once the opened position of roof 1 has been reached. During the opening motion, the front edge of rear roof part moves downward with respect to fixed roof outer skin 2.

As such, to enable the opened position, rear roof part 5 assumes a lowered position in which its front edge is moved downward in a direction toward the vehicle interior. To transfer to the closed position, front roof part 4 first moves forward in direction 6 until front roof part 4 reaches the closed position. The outer sides of front roof part 4 lie in a common plane at the level of outer roof skin 2 in both the closed and opened positions. Subsequently, the front edge of rear roof part 5 is lifted upward (i.e., in a direction opposite to the vehicle interior) until the entire length of the outer sides of rear roof part 5 lie in a common plane at the level of outer roof skin 2.

A kinematic support mechanism 7 is used to ensure that rear roof part 5 is securely locked in place and unintentional lowering of rear roof part 5 is prevented when roof 1 is in the closed position. In general, front roof part 4 actuates kinematic support mechanism 7 and kinematic support mechanism 7 acts on rear roof part 5. Kinematic support mechanism 7 is mounted in a roof section 8 fixed to the vehicle body. Roof section 8 is below roof parts 4, 5.

Kinematic support mechanism 7 includes a pivot lever 9 and a kinematic knee lever mechanism 10. Pivot lever 9 has the shape of a wishbone. A rotary joint 11 pivotably supports pivot lever 9 on roof section 8. Pivot lever 9 has a first arm 9a and a second arm 9b. A pin 12 is situated on first arm 9a of pivot lever 9. Pin 12 cooperates with a hook 13 located on the underside of front roof part 4 when roof 1 is in the closed position. Second arm 9b of pivot lever 9 extends to the rear in the direction of rear roof part 5. A holding prong 14 is on the end face of second arm 9b. Holding prong 14 cooperates with kinematic knee lever mechanism 10. As soon as hook 13 on the underside of front roof part 4 engages with pin 12 on first arm 9a of pivot lever 9, pivot lever 9 swivels about rotary joint 11 which is fixed to roof section 8. Whereupon, second arm 9b of pivot lever 9 is lifted and kinematic knee lever mechanism 10 is raised from a folded-up position (shown in FIG. 2) in the direction of an approximately extended position (shown in FIG. 6). The approximately extended position of kinematic knee lever mechanism 10 is achieved when roof parts 4, 5 are closed in the closed position of roof 1.

Kinematic knee lever mechanism 10 includes two knee levers 15, 16. Knee levers 15, 16 are articulately coupled to one another via a rotary joint 17 situated therebetween. Lower knee lever 15 is pivotably mounted to roof section 8 by a rotary joint 18 on its end face side. Upper knee lever 16 is pivotably coupled to rear roof part 5 via a rotary joint 19 on its end face side.

Holding prong 14 on the end face side of second arm 9b on pivot lever 9 surrounds rotary joint 19 without being fixedly connected thereto. As such, holding prong 14 pushes upper knee lever 16 upward when pivot lever 9 swivels about rotary joint 11 thereof. This causes the front edge of rear roof part 5 to raise from the lowered position to a lifted position in which the entire rear roof part 5 lies in a common plane with outer roof skin 2.

Figure 6:
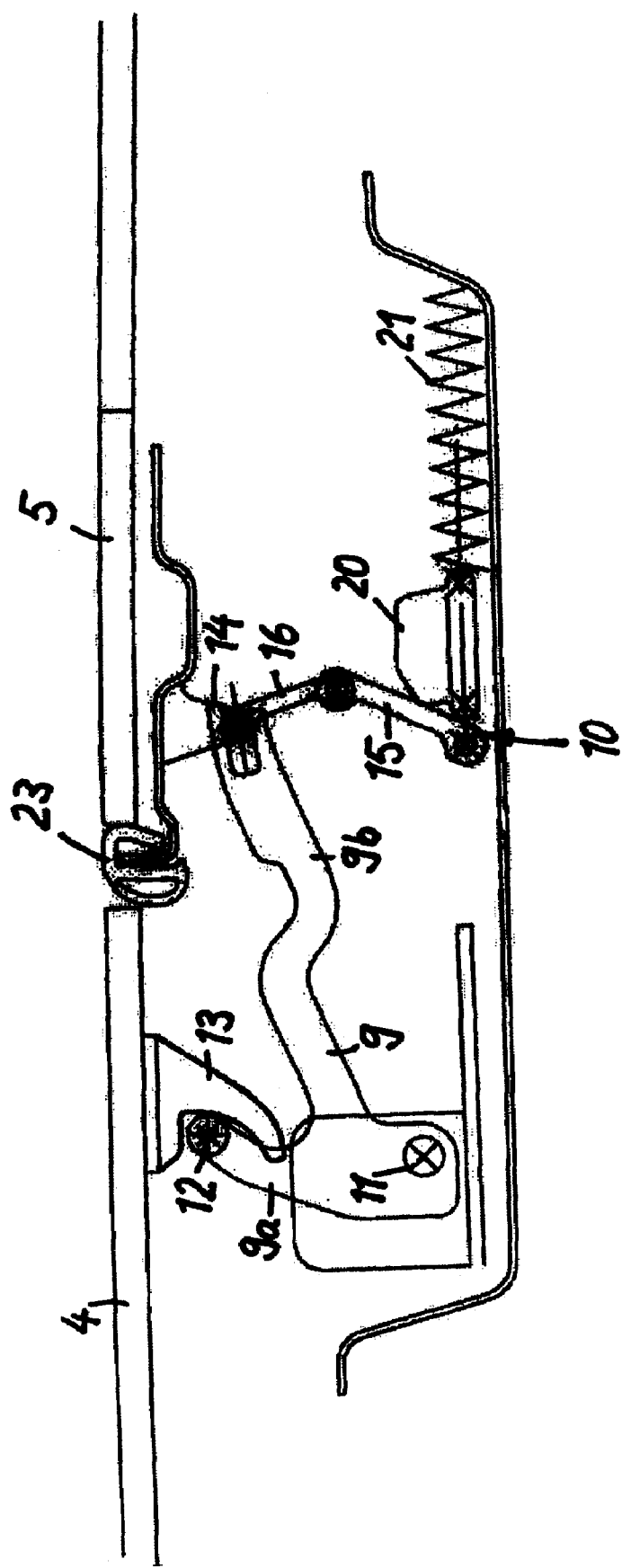
FIG. 6 illustrates the roof parts and the kinematic support mechanism in the closed position.

A locking slide 20 is used to lock kinematic knee lever mechanism 10 in the extended (i.e., raised) position (shown in FIG. 6). Locking slide 20 is axially movable on roof section 8 in directions parallel to forward F direction of travel. A bias force generated by a spring element 21 acts upon locking slide 20. The bias force of spring element 21 moves locking slide 20 into a retracted position directed away from kinematic knee lever mechanism 10 (see, for example, FIG. 2). One end of a Bowden cable 22 (labeled in FIG. 3) engages with locking slide 20. The other end of cable 22 is connected to pivot lever 9 to be actuated by the adjusting motion of front roof part 4. Optionally, the other end of cable 22 may be coupled to another component which is actuated by the adjusting motion of front roof part 4. For example, the other end of cable 22 may engage directly with front roof part 4.

When hook 13 on front roof part 4 engages with pin 12 on pivot lever 9, pivot lever 9 moves about its rotary joint 11. As soon as pivot lever 9 moves about its rotary joint 11, holding prong 14 on second arm 9b of pivot lever 9 moves downward thereby pushing kinematic knee lever mechanism 10 in the direction of its extended position. Simultaneously, pivot lever 9 actuates cable 22 and locking slide 20 is moved against the force of spring element 21 in the direction of kinematic knee lever mechanism 10.

FIG. 4 illustrates locking slide 20 in a position just before contacting lower knee lever 15 of kinematic knee lever mechanism 10. FIG. 5 illustrates locking slide 20 contacting lower knee lever 15 of kinematic knee lever mechanism 10. By contacting lower knee lever 15, locking slide supports kinematic knee lever mechanism against swivelling back in the direction of its folded-up position (shown, for example, in FIG. 2). Simultaneously, rear roof part 5 is lifted further by impingement via pivot lever 9 and kinematic knee lever mechanism 10.

FIG. 6 illustrates the closed position of roof 1 in which both roof parts 4, 5 lie in a common plane which also is the plane of outer roof skin 2. A sealing element 23 is situated between roof parts 4, 5. Sealing element 23 is mounted on the end face side of rear roof part 5. In the closed position of roof 1, kinematic knee lever mechanism 10 is approximately in the extended position in which knee levers 15, 16 define an angle of at least 150°. In this extended position, locking slide 20 supports lower knee lever 15 so that kinematic knee lever mechanism 10 cannot leave this position even when rear roof part 5 is acted on by a large downward force. Such forces are largely intercepted by kinematic knee lever mechanism 10 and by locking slide 20 as well as by pivot lever 9 via holding prong 14.

To release the locking or support position, it is necessary only to move front roof part 4 slightly in the direction of the opening position. Whereupon locking slide 20 is retracted by the effect of spring element 21 such that kinematic knee lever mechanism 10 leaves its support position and may be moved in the direction of the folded-up position. Simultaneously, pivot lever 9 swivels about its rotary joint 11 on the roof side causing second arm 9b of pivot lever 9 to be swivelled downward. This assists in the transfer of kinematic knee lever mechanism 10 in the direction of the folded-up position. Pivot lever 9 may be swivelled back by another coupling between front roof part 4 and pivot lever 9, or the swivel motion of pivot lever 9 and kinematic knee lever mechanism 10 may be achieved by the force of gravity, which is transmitted from rear roof part 5 to kinematic knee lever mechanism 10 and to pivot lever 9 via holding prong 14.

In this embodiment, kinematic knee lever mechanism 10 assumes an approximately extended position in its support position without reaching the dead center or beyond dead center position. However, in alternative embodiments, kinematic knee lever mechanism 10 may assume a dead center or beyond dead center position in the support position.

LIST OF REFERENCE NUMERALS

1 Vehicle roof
2 Outer roof skin
3 Roof opening
4 Front roof part
5 Rear roof part
6 Arrow direction
7 Kinematic support mechanism
8 Roof section
9 Pivot lever
9a First Arm
9b Second Arm
10 Kinematic knee lever mechanism
11 Rotary joint
12 Pin
13 Hook
14 Holding prong
15 Lower Knee lever
16 Upper Knee lever
17 Rotary joint
18 Rotary joint
19 Rotary joint
20 Locking slide
21 Spring element
22 Bowden cable
23 Sealing element While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A vehicle roof comprising:
a roof opening in a fixed outer roof skin;
first and second roof parts movable between a closed roof position, in which the roof parts are arranged flush behind one another within the roof opening and lie flush with the fixed outer roof skin to thereby close off the roof opening, and in an opened roof position, in which a first edge of the second roof part is lowered with respect to the fixed outer roof skin, an opposite second edge of the second roof part lies flush with the fixed outer roof skin, and the first roof part extends over the first edge of the second roof part to thereby expose the roof opening; and
a kinematic support mechanism having an upper knee lever pivotably coupled to both a lower knee lever and the second roof part such that the kinematic support mechanism is movable between an extended support position in which the kinematic support mechanism fixes the second roof part in the closed roof position and a retracted support position in which the kinematic support mechanism pivotably lowers the first edge of the second roof part in the opened roof position;
wherein the first roof part and the kinematic support mechanism are connected to one another such that the first roof part actuates the kinematic support mechanism between the extended and retracted support positions in response to the first roof part moving between the closed and opened roof positions.

2. A vehicle roof comprising:
a roof opening in a fixed outer roof skin;
first and second roof parts movable between a closed roof position in which the roof parts are arranged flush behind one another within the roof opening to thereby close off the roof opening and in an opened roof position in which the second roof part is lowered with respect to the fixed outer roof skin and the first roof part extends over the second roof part to thereby expose the roof opening; and
a kinematic support mechanism movable to an extended support position in which the kinematic support mechanism fixes the second roof part in the closed roof position and in a retracted support position in which the kinematic support mechanism lowers the second roof part in the opened roof position;
wherein the first roof part and the kinematic support mechanism are connected to one another such that the first roof part actuates the kinematic support mechanism between the support positions in response to the first roof part moving between the closed and opened roof positions;
wherein the kinematic support mechanism includes a kinematic knee lever mechanism movable by the first roof part into the extended support position in which a pair of knee levers of the kinematic support lever mechanism support the second roof part, wherein the knee levers are articulately connected to one another, wherein the knee levers include a lower knee lever and an upper knee lever, wherein the lower knee lever is articulately connected to a fixed support and the upper knee lever is articulately connected to the second roof part.

3. The roof of claim 2 wherein:
the kinematic support mechanism includes a transmission arm which in the closed roof position is acted upon by the first roof part, and on a side facing away from the first roof part acts upon a rod associated with the second roof part.

4. The roof of claim 3 wherein:
the transmission arm is a pivot lever pivotably supported about a rotary joint.

5. The roof of claim 4 wherein:
the rotary joint of the pivot lever is supported on a fixed support such as a roof section fixed to the vehicle body.

6. The roof of claim 3 wherein:
the transmission arm acts upon the upper knee lever.

7. The roof of claim 1 wherein:
the first roof part in the closed roof position secures the kinematic support mechanism in the extended support position against inadvertently leaving the extended support position.

8. The roof of claim 7 wherein:
a component actuated by the first roof part secures the kinematic support mechanism in the extended support position.

9. The roof of claim 7 wherein:
a locking slide supports the kinematic support mechanism from moving out of the extended support position when the kinematic support mechanism is in the extended support position.

10. The roof of claim 9 wherein:
a Bowden cable couples the locking slide to the first roof part such that the locking slide is actuated by the first roof part as the first roof part moves between the closed and opened roof positions.

11. The roof of claim 9 wherein:
a spring provides a biasing force to the locking slide.

12. The roof of claim 1 wherein:
the kinematic support mechanism is supported on a fixed support such as a roof section fixed to the vehicle body.

13. The roof of claim 1 wherein:
the first roof part is the front roof part in the direction of travel, and the second roof part is the rear roof part situated behind the front roof part.

14. A vehicle roof comprising:
a roof opening in a roof skin;
front and rear roof parts movable between a closed roof position in which the roof parts are arranged flush behind one another within the roof opening to thereby close off the roof opening and in an opened roof position in which the rear roof part is lowered with respect to the roof skin and the front roof part extends over the rear roof part to thereby expose the roof opening; and
a kinematic knee lever mechanism having lower and upper knee levers articulately connected to one another in which the knee levers are movable to an extended support position to fix the rear roof part in the closed roof position and in a retracted support position to lower the rear roof part in the opened roof position, wherein the lower knee lever is articulately connected to a fixed support and the upper knee lever is articulately connected to the rear roof part;
wherein the front roof part and the kinematic knee lever mechanism are connected to one another such that the front roof part actuates the knee levers of the kinematic knee lever mechanism between the support positions in response to the front roof part moving between the closed and opened roof positions.

15. The roof of claim 14 wherein:
the kinematic support mechanism includes a transmission arm which in the closed roof position is acted upon by the front roof part, and on a side facing away from the front roof part acts upon a rod associated with the rear roof part.

16. The roof of claim 15 wherein:
the transmission arm is a pivot lever pivotably supported about a rotary joint.

17. The roof of claim 16 wherein:
the rotary joint of the pivot lever is supported on a fixed support such as a roof section fixed to the vehicle body.

18. The roof of claim 17 wherein:
the transmission arm acts upon the upper knee lever.

* * * * *